UNITED STATES PATENT OFFICE.

CARL OSCAR MÜLLER, OF BASLE, SWITZERLAND, ASSIGNOR TO THE BADISCHE ANILIN AND SODA FABRIK, OF LUDWIGSHAFEN, GERMANY.

YELLOW BASIC DYE.

SPECIFICATION forming part of Letters Patent No. 633,883, dated September 26, 1899.

Application filed June 23, 1899. Serial No. 721,611. (No specimens.)

*To all whom it may concern:*

Be it known that I, CARL OSCAR MÜLLER, chemist, a subject of the King of Saxony, and a resident of Basle, Switzerland, have invented a new Yellow Basic Coloring-Matter, of which the following is a clear, full, and exact specification.

If phthalic anhydride and a mono-alkylated meta-amido-phenol (mono-methyl- or mono-ethyl-meta-amido-phenol) be heated together, with or without the use of a condensing agent, such as chlorid of zinc, not only dialkyl-rhodamin is formed, but a considerable quantity of by-product, which remains in the alkaline mother-liquor when the rhodamin base is precipitated. This by-product possesses an acid character and can be precipitated from the said mother-liquid by acids. It has hitherto been a useless waste product. I have discovered that it can by suitable treatment be converted into a new yellow basic coloring-matter soluble in water and possessing valuable dyeing properties.

The process by which I convert the said waste product into my new coloring-matters consists in first treating it with alcoholic hydrochloric acid, so as to remove all pitchy matters and convert it into a yellow crystalline intermediate product, which is but slightly soluble even in boiling water. If desired, the waste product can first be heated with an alkaline solution, say caustic soda, either at ordinary pressure or in an autoclave. After this treatment the action of the alcoholic hydrochloric acid need not be so prolonged as is otherwise the case. The crystalline intermediate product obtained as hereinbefore described is converted into my new coloring-matter by submitting it to esterification, for instance, by treatment with sulfuric acid and an alcohol.

The following example will serve to illustrate the manner in which my invention can be carried into effect and my new coloring-matter obtained: Prepare a dialkyl-rhodamin melt in the well-known way from say ten (10) parts mono-ethyl-meta-amido-phenol, ten (10) parts of phthalic anhydride, and five (5) parts chlorid of zinc. Work up in the known way by washing with water and treating with ammonia and filter to separate the rhodamin base. (See United States Patent No. 456,081.) To the mother-liquor add sufficient acid to precipitate the by-product. Now mix together two hundred (200) parts of the said by-product, six hundred (600) parts of water, and two hundred (200) parts of caustic-soda lye, (containing thirty per cent. NaOH.) Heat this mixture for about seven hours to a temperature of from 150° to 160° centigrade in an autoclave. Then filter, and in order to precipitate the product add so much hydrochloric acid that a distinct excess thereof is present. Treat the precipitated product by boiling with one hundred and sixty (160) parts of alcohol, one hundred and fifty (150) parts of water, and fifty (50) parts of hydrochloric acid, (containing twenty-nine per cent. HCl.) Allow the mixture to cool to 60° and collect the crystals which separate by filtration. Wash the crystals with a mixture of alcohol, water, and hydrochloric acid in the aforesaid proportions repeatedly until no more pitchy admixtures are dissolved. Yellow crystals of the intermediate product are obtained in this way, which dissolve in alkalies, giving a greenly fluorescent solution. They are but slightly soluble in dilute acids. To obtain my new coloring-matter, mix thirty (30) parts of the crystals so obtained with eighty (80) parts of alcohol and seventy (70) parts of sulfuric acid monohydrate. Heat this mixture for about six hours on the boiling-water bath until a clear solution be obtained. Allow the mixture to cool and run it into about seven hundred (700) parts of cold water, which is maintained alkaline by the addition of caustic-soda lye throughout. Cool the liquid and so regulate the rate of mixing that the temperature does not rise above, say, 35° centigrade. The coloring-matter base separates out and is collected by filtration, washed with water, and treated in a centrifugal machine. Dissolve it in a boiling mixture of eighty (80) parts alcohol, eighty (80) parts of water, and twenty (20) parts of hydrochloric acid. Filter in a closed vessel to free from insoluble impurities. Allow the mixture to cool to about 40° centigrade and add fifty (50) parts of hydrochloric acid and fifty (50) parts water to completely precipitate the coloring-matter. When the separation has taken place, filter, press, and dry. If desired, the coloring-matter can be purified by recrystallizing from water.

My new coloring-matter dissolves in water, giving orange-yellow solutions with greenish fluorescence. It is also readily soluble in alcohol and in concentrated sulfuric acid. It dyes cotton mordanted with tannin, giving beautiful yellow shades. It is further characterized by yielding on treatment with warm dilute caustic-soda solution the crystalline intermediate product, soluble in alkalies, but practically insoluble in dilute acids from which it is obtained.

Now what I claim is—

The new yellow basic coloring-matter which can be obtained from the by-product from the action of phthalic anhydride with mono-alkyl-meta-amido-phenol and which is soluble in water giving a yellow fluorescent solution, and which, on treatment with warm dilute caustic-soda solution, is converted into a yellow crystalline product almost insoluble in dilute acids, soluble in alkalies giving a solution possessing a greenish fluorescence, all substantially as described.

In witness whereof I have hereunto signed my name, this 8th day of June, 1899, in the presence of two subscribing witnesses.

CARL OSCAR MÜLLER.

Witnesses:
GEORGE GIFFORD,
AMAND RITTER.